Oct. 11, 1966  C. JENSEN  3,277,847
LIGHTWEIGHT COMPACT VERSATILE PALLET
Filed Sept. 9, 1965
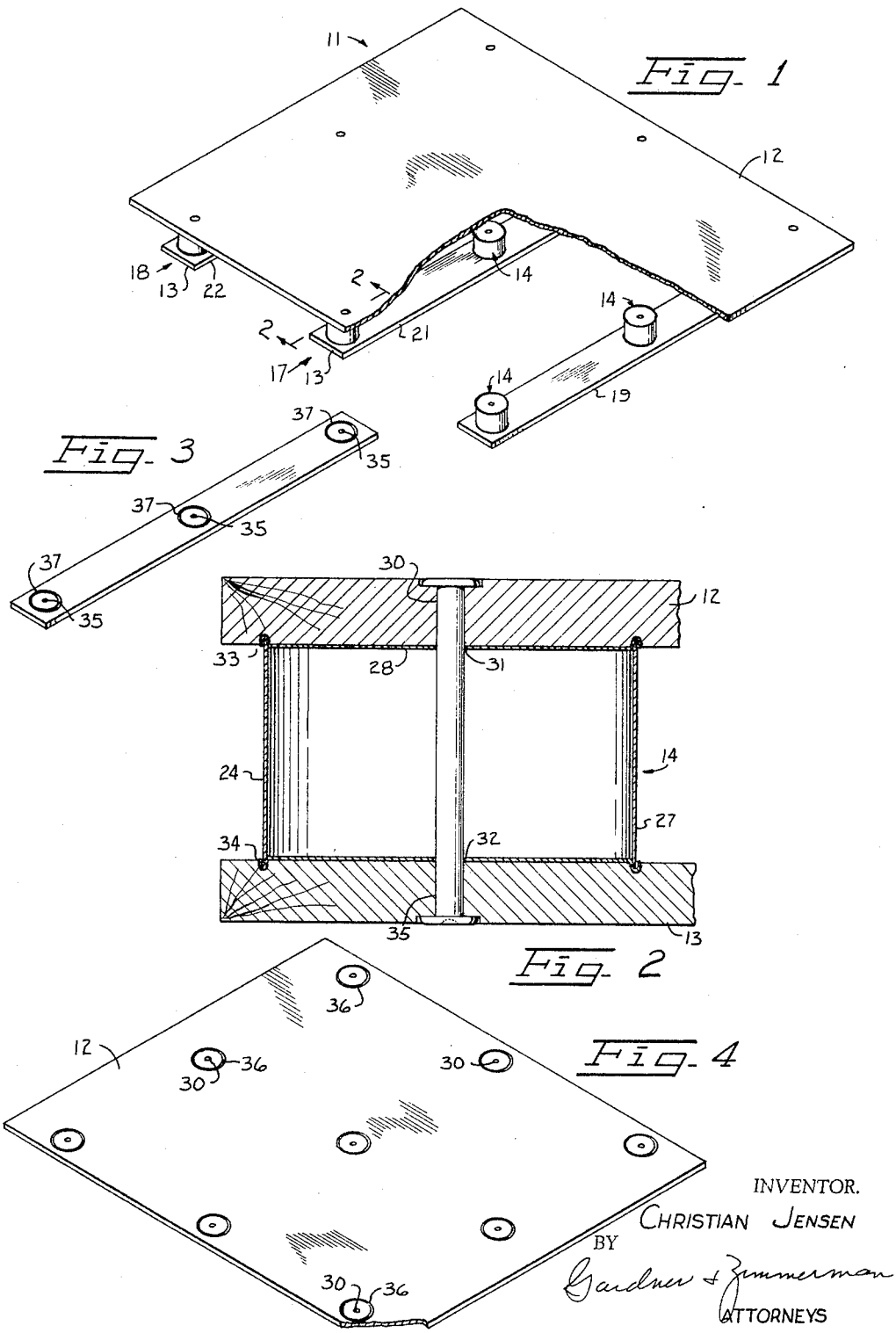
INVENTOR.
CHRISTIAN JENSEN
BY
Gardner & Zimmerman
ATTORNEYS

United States Patent Office 3,277,847
Patented Oct. 11, 1966

3,277,847
LIGHTWEIGHT COMPACT VERSATILE PALLET
Christian Jensen, 5435 Brookdale Ave., Oakland, Calif.
Filed Sept. 9, 1965, Ser. No. 486,008
5 Claims. (Cl. 108—51)

The present invention relates generally to pallets for supporting goods during storage and transportation. More particularly it appertains to a pallet characterized by a platform of one piece construction uniquely supported to provide versatility in the handling thereof.

In storing, handling and transporting goods, often times the goods are placed on pallets which are handled by fork lifts, pallet jacks and other mechanical pallet handling means. In handling a pallet, it is most desirable to be able to engage and life the pallets with the mechanical pallet handling means from any of its sides. However, because of the construction of conventional pallets, i.e., a plurality of spaced top boards permanently mounted to spaced apart skids or ribs, the handling thereof can be effected only from the two sides perpendicular to the skids or ribs.

In addition to a more versatile handling capability, there are other related desirable features which if provided for in the design of the pallets would enhance their utility. For example, in many cases of transporting goods on pallets, after delivery has been accomplished, the pallets are returned to the shipper unloaded. Because of the bulkiness of conventional pallets, the return freight space required often times is quite considerable, hence costly. Consequently, it would be extremely advantageous to have a rugged, lightweight and compact pallet, and even more desirable, one that is capable of being disassembled. Such a pallet would reduce freight charges and be much easier to handle. Also, because of the spacing of the top boards of most conventional pallets, frequently goods placed thereon are damaged as a result of being wedged between top boards. Of course, it would be preferred to eliminate the possibility of damaging goods placed on pallets.

The present invention provides a pallet including a uniquely supported top platform of one piece construction which accomplishes the foregoing and thereby overcomes many of the limitations and disadvantages of the prior art conventional pallets. More specifically, the versatility in handling, compactness and lightness in weight of the pallet of the present invention are accomplished by supporting the top platform with at least two spaced apart rows of a plurality of spaced apart columnar members, each member being mounted to a bottom support member. By adjusting the spacing between the rows of columns and the columns of each row to be able to receive therein the blades of a fork lift or the lifting apparatus of other mechanical pallet handling means, the pallet may be engaged and lifted from any of its sides. Since the top platform is of one piece construction, the possibility of damaging goods placed thereon is virtually eliminated. Because columnar members are employed to support the top platform, a pallet as set forth hereinabove can be constructed which is characterized by having a gross weight considerably less than that of conventional pallets. This is evident when it is considered that conventional pallets often are constructed with either relatively heavy four-by-four wood ribs members positioned between a plurality of spaced top and bottom boards, or relatively heavy two-by-six wood skids on which the spaced top boards are mounted. Furthermore, by detachably mounting the columnar members to the top platform and bottom support member, the entire pallet could be disassembled for temporary storage or transportation. In its disassembled form, the pallet would require little space as compared to its assembled form.

Accordingly, it is a principal object of the present invention to provide a rugged, lightweight and compact pallet for supporting goods during storage and transportation. More particularly, it is an object of this invention to provide such a pallet capable of being engaged and lifted by mechanical means from any of its sides. Another object of this invention is to provide such a pallet which when not in use can be disassembled for storage or transportation. Still another object of this invention is to provide a pallet which minimizes the possibility of damage occurring to goods placed thereon.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is an isometric projection of a pallet constructed in accordance with the present invention with its top platform partially cutaway to show the arrangement of the columnar members. FIGURE 2 is a sectional view of FIGURE 1 taken at lines 2—2. FIGURE 3 is a isometric view of a bottom runner of the pallet portrayed in FIGURE 1. FIGURE 4 is a isometric view of the underside of the top platform of the pallet illustrated in FIGURE 1.

With reference to the figures, one embodiment of a pallet 11 constructed in accordance with the present invention comprises a top platform 12 supported spaced above bottom planar, support members 13 by a plurality of spaced apart columnar members 14. To insure that platform 12 remains level when loaded, at least four columnar members 14 are arranged about and proximate the periphery of platform 12 to surround the pallet's center of mass. For example, as shown in FIGURE 1, one columnar member 14 is situated proximate each corner of the rectangular shaped platform 12. However, it should be appreciated that the circumference of platform 12 can define other geometrical shapes, such as a square, circle or polygon.

In handling a loaded pallet 11 with, for example, a fork lift, it is extremely important that the center of mass of the pallet 11 be located between the blades of the fork lifts. The significance of this factor is evident when it is considered that if pallet 11 is raised from one side of its center of mass, it will tend to tip with the possible consequence of the goods loaded thereon falling off. Hence, in one preferred embodiment, rectangular platform 12 is supported by first, second and third spaced parallel rows 16, 17, and 18 respectively of three spaced apart columnar members 14. The center row 17 of columnar members 14 is located along a line which bisects platform 12. Furthermore, the center columnar members 14 of the rows are arranged to define a platform bisecting line perpendicular to that defined by center row 17. The columnar members 14 of rows 16 and 18, and the outside columnar members 14 of center row 17 are mounted to platform 12 proximate its periphery. Preferably, these columnar members 14 are set back from the periphery of platform 12, approximately four inches, in order to provide the necessary depth and clearance for handling pallet 11 with spreader bars employed in loading ships. With platform 12 supported by three rows of three columnar members 14, pallet 11 can be engaged from any of its sides thereby affording versatility in its handling. Furthermore, center row 17 and center columnar members 14 of rows 16 and 18 together serve as guides for the pallet handling means whereby regardless of the pallet side engaged thereby, pallet 11 will be lifted correctly, i.e., without being tipped.

A complete pallet includes the bottom support member 13. Such member could take various forms such as a one piece bottom platform or individual support members associated with each columnar member 14. With a platform type bottom support member 13, rigidity and strength are gained at the expense of gross weight. On the other hand, with individual type support members 13, lightness in weight is gained at the expense of rigidity and strength. To optimize rigidity and strength, and lightness in weight, it is preferred that the ends of columnar members 14 of each of the rows 16, 17 and 18 distal platform 12 be secured respectively to runners 19, 21 and 22. It has been found that an unusually compact, rugged and lightweight standard size pallet can be obtained by fabricating platform 12 and runners 19, 21 and 22 from ⅜ inch three ply plywood and adjusting the lengths of columnar members to about 2 inches. Such a pallet, when assembled measures approximately six cubic feet. This compares most favorably with the average conventional pallet which measures eight cubic feet. Concomitant with this compactness feature characteristic of the pallet of the present invention is the savings in freight costs when charge is made by space since less space is required in transporting a given quantity of goods.

As noted hereinbefore many advantages are to be gained by rendering pallet 11 disassemblable. With particular reference to FIGURE 2, it is seen that columnar member 14 is fastened between platform 12 and runner 17 by a single rivet 23 extending through columnar members 14. For ease of disassembly, hollow flat head rivets are used in assembling pallet 11. Of course other suitable fastening means may be employed to secured the parts of pallet 11 together, for example nuts and bolts. However, rivets are less expensive and can easily be removed by cutting or drilling.

Various configurations of columnar members 14 can be employed to support platform 12. For example, solid or hollow posts may be utilized. Also, columnar members of various cross sectional configurations can serve as supports for platform 12, some being square, rectangular, circular and elliptical. In addition, columnar members 14 can be constructed from many different types of material, for example, wood and metal. However, many unique advantages accrue to the pallet of the present invention by employing a hollow cylindrical can-like columnar members to support platform 12. Referring to FIGURES 1 and 2, the can-like columnar members 14 comprises a hollow cylinder 24 having one of its ends 26 mounted to the platform 12 and its opposite end 27 to the runner 17. To impart additional strength to cylinder 24, each of its ends 26 and 27 is provided with top and bottom lids 28 and 29 respectively. To afford the means of fixing cylinder 24 between platform 12 and runner 17 with rivet 23, lids 28 and 29 are provided with apertures 31 and 32 respectively which are axially aligned with each other and with apertures 30 and 35 in platform 12 and runner 17. It is readily seen that by supporting pallet platform 12 by can-like hollow cylinder columnar members 14, the gross weight of the pallet 11 will be considerably less than that of conventional pallets. In fact, a six cubic foot pallet constructed in accordance with the above will weigh approximately thirty-five pounds whereas the average eight cubic foot conventional pallet weighs approximately sixty-five pounds. Such a large savings in pallet weight, i.e., approximately thirty pounds, not only results in a savings in freight costs but also renders the pallet 11 much easier to handle.

Additional rigidity and strength is imparted to pallet 11 by extending hollow cylinder 24 beyond both top and bottom lids 28 and 29 to define circular rim sections 33 and 34 respectively at ends 26 and 27 of hollow cylinder 24. With reference to FIGURES 2–4, top platform 12 and runners 16, 17 and 18 each are provided with circular recesses 36 and 37 for receiving rim sections 33 and 34 respectively. These rim sections transmit most of the load on the pallet directly to the vertical walls of cylinders 24, and by engaging the recesses 36 and 37 prevent the cylinders from slipping or moving.

To protect against failure at the rim sections, it is desirable to either strengthen rim sections 33 and 34 or to distribute a portion of the load and displacement causing forces over a greater portion of members 14. For this reason, the lids 28 and 29 abut against the top platform 12 and the runners respectively. Hence, load forces and forces exerted on pallet 11 tending to displace cylinder members 14 will be absorbed both by rim sections 33 and 34, and lids 28 and 29.

By constructing pallet 11 in accordance with the description set forth hereinabove, a rugged, lightweight and compact pallet will be provided which is characterized by allowing versatility in handling, economizing the storaging and transporting of goods while minimizing the possibility of damaging goods placed thereon. It should be noted that even further strengthening of pallet 11 can be accomplished by arranging the grain of platform 12 to be perpendicular to that of runners 16, 17, and 18.

What is claimed is:

1. A lightweight compact versatile pallet comprising a top platform, a bottom planar support means arranged in a plane parallel to said platform, a first row of three equally spaced apart columnar members mounted at opposite ends respectively to said platform and said bottom support means, a second row of three equally spaced apart columnar members mounted at opposite ends respectively to said platform and said bottom support means and being spaced apart from said first row, a third row of three equally spaced apart columnar members mounted at opposite ends respectively to said platform and said bottom support means and being spaced away from and midway between said first and second rows of columnar members, said bottom planar support means including first, second and third runners, said first runner mounted to said columnar members of said first row, said second runner mounted to said columnar members of said second row, and said third runner mounted to said columnar members of said third row, said columnar members being hollow cylinders with top and bottom lids mounted at opposite ends thereof, said top lid of each cylinder defining a first lid aperture, said bottom lid of each cylinder defining a second lid aperture in axial alignment with said first lid aperture, said platform defining nine platform apertures each individually aligned with the lid apertures of one of said cylinders, and each of said runners defining three runner apertures each individually aligned with the lid apertures of one of said cylinders of said row.

2. The pallet as recited in claim 1 further defined by said hollow cylinders being provided with a circular rim extension at each of its opposite ends, the platform surface facing said cylinders defining nine circular recesses for receiving said rim extensions, and the surface of each runners facing said cylinders defining three circular recesses for receiving said rim extension of said cylinders of one row.

3. The pallet as recited in claim 2 further defined by said lids having an annular raised section proximate their respective peripheries, the platform surface facing said cylinders defining nine annular seats for receiving said annular raised section of said lids, and the surface of each runner facing said cylinders defining three annular seats for receiving said annular raised section of said lids of the cylinders of one row.

4. The pallet as recited in claim 3 further defined as comprising rivets for joining through said apertures said platform, runners and hollow cylinders, and said platform and runners composed of plywood.

5. A lightweight compact versatile pallet comprising a top platform, a bottom planar support means arranged in a plane parallel to said platform, at least two rows of columnar members mounted at spaced apart locations between said top platform and said bottom support means, each of said columnar members being a hollow cylinder having top and bottom lids in engagement with the top platform and the bottom support means, respectively, the cylindrical wall of each columnar member extending axially beyond its lids to provide rim extensions at opposite ends of said columnar member, and said top platform and said bottom planar support means having recesses in their surfaces facing said columnar members into which said rim extensions fit to engage said platform and said bottom support means.

References Cited by the Examiner

UNITED STATES PATENTS

| 2,876,896 | 3/1959 | Ziehmer | 206—65 |
| 3,106,174 | 10/1963 | Newton | 108—51 |
| 3,123,020 | 3/1964 | Voissem | 108—51 |

FOREIGN PATENTS

| 934,005 | 8/1963 | Great Britain. |
| 362,031 | 6/1962 | Switzerland. |

FRANK B. SHERRY, *Primary Examiner.*

G. O. FINCH, *Assistant Examiner.*